(12) United States Patent
Zaccaria et al.

(10) Patent No.: US 10,081,306 B2
(45) Date of Patent: Sep. 25, 2018

(54) HANGER MOUNTING ASSEMBLY

(71) Applicant: David Zaccaria, Price, UT (US)

(72) Inventors: David Zaccaria, Price, UT (US);
Rosalie Marie Gutierrez, Price, UT (US)

(73) Assignee: David Zaccaria, Price, UT (US)

( * ) Notice: Subject to any disclaimer, the term of this patent is extended or adjusted under 35 U.S.C. 154(b) by 138 days.

(21) Appl. No.: 14/828,066

(22) Filed: Aug. 17, 2015

(65) Prior Publication Data
US 2017/0050574 A1 Feb. 23, 2017

(51) Int. Cl.
| | | |
|---|---|---|
| B60R 7/10 | (2006.01) | |
| A47G 25/14 | (2006.01) | |
| A47G 25/08 | (2006.01) | |
| B60N 2/90 | (2018.01) | |

(52) U.S. Cl.
CPC ............... *B60R 7/10* (2013.01); *A47G 25/08* (2013.01); *A47G 25/145* (2013.01); *B60N 2002/905* (2018.02)

(58) Field of Classification Search
CPC .... B60R 7/042; B60R 2011/0012–2011/0017; B60R 2011/0276
USPC ........................................ 224/275, 925, 927
See application file for complete search history.

(56) References Cited

U.S. PATENT DOCUMENTS

| | | | | |
|---|---|---|---|---|
| 741,098 A | * | 10/1903 | Bibler ..................... A45C 13/38 224/260 |
| 1,815,673 A | * | 7/1931 | Kelley .................. A47G 25/485 211/119 |
| 2,132,556 A | * | 10/1938 | Blackshaw .......... A47D 15/006 297/484 |
| 2,609,104 A | * | 9/1952 | Leach ..................... A47G 25/08 211/113 |
| 3,014,759 A | * | 12/1961 | Bing ........................ B60R 7/043 224/275 |
| 3,167,182 A | * | 1/1965 | Calvin .................. A47B 81/005 211/64 |
| 3,317,098 A | * | 5/1967 | Auraen ............... B27B 17/0008 224/250 |
| 3,559,853 A | * | 2/1971 | Strassman ................. A45F 5/00 224/258 |
| 3,563,430 A | * | 2/1971 | Forrest ...................... A45F 5/00 224/255 |
| 3,584,772 A | * | 6/1971 | Robertson ................. A45F 5/10 224/313 |
| 4,002,277 A | * | 1/1977 | Westerholm .............. A45F 5/00 280/814 |
| 4,337,938 A | * | 7/1982 | Rodriguez ......... A63B 69/0059 224/258 |
| 4,419,794 A | * | 12/1983 | Horton, Jr. ................ A45F 5/02 224/197 |

(Continued)

*Primary Examiner* — Brian D Nash
(74) *Attorney, Agent, or Firm* — Workman Nydegger

(57) ABSTRACT

A hanger mounting assembly for mounting one or more hangers onto a surface for convenient organized mounting of the hangers, the hanger mounting assembly comprising a flexible strap configured to be selectively mounted onto a surface, and one or more mounting members flexibly mounted on the strap for receiving one or more hangers, such that one or more hangers can be selectively and conveniently mounted on the hanger mounting assembly and such that the hanger mounting assembly can be selectively repositioned to a different location selected by the user.

14 Claims, 4 Drawing Sheets

(56) References Cited

U.S. PATENT DOCUMENTS

| | | | | |
|---|---|---|---|---|
| 5,143,266 A * | 9/1992 | Heckerman | A44B 11/006 | 224/150 |
| 5,246,154 A * | 9/1993 | Adams | A45F 3/14 | 224/150 |
| 5,415,457 A * | 5/1995 | Kifer | B60N 2/70 | 224/275 |
| 5,551,379 A * | 9/1996 | Hart | A01K 27/003 | 119/771 |
| D390,001 S * | 2/1998 | Lovelady | D3/221 | |
| 5,762,242 A * | 6/1998 | Yost | A63C 11/021 | 224/250 |
| 5,800,106 A * | 9/1998 | Miller | B60P 7/0807 | 24/303 |
| 5,836,634 A * | 11/1998 | Finkelman | A45F 5/1026 | 294/159 |
| 6,053,570 A * | 4/2000 | Stern | A47C 7/62 | 211/86.01 |
| 6,123,239 A * | 9/2000 | Lovitt | B62J 9/00 | 190/103 |
| 6,199,731 B1 * | 3/2001 | Lehoux | A45F 3/14 | 224/259 |
| 6,279,799 B1 * | 8/2001 | Horton | B60R 7/14 | 211/64 |
| 6,371,346 B1 * | 4/2002 | Sharma | A45F 3/14 | 224/195 |
| D457,725 S * | 5/2002 | Parsons | D3/327 | |
| 6,446,849 B1 * | 9/2002 | Schleifer | A43B 5/0425 | 224/258 |
| 6,637,077 B2 * | 10/2003 | Doty | B60P 3/079 | 24/298 |
| 6,651,941 B1 * | 11/2003 | Kinsel | A45F 5/1026 | 248/100 |
| D508,323 S * | 8/2005 | Douglas | D3/328 | |
| 6,923,356 B2 * | 8/2005 | Reynolds | A45F 3/14 | 224/254 |
| 7,243,825 B2 * | 7/2007 | Weisenfeld | B60R 7/02 | 224/311 |
| 7,343,647 B1 * | 3/2008 | Kinskey | A45F 5/00 | 16/406 |
| 7,681,766 B2 * | 3/2010 | Harrison, III | A45F 3/10 | 224/265 |
| 8,132,302 B2 * | 3/2012 | Wilkinson | B65H 75/366 | 224/254 |
| D676,618 S * | 2/2013 | Kalbach | D30/152 | |
| 9,199,580 B2 * | 12/2015 | Lehtonen | B60R 7/043 | |
| 9,420,872 B2 * | 8/2016 | Bird | A01M 31/004 | |
| 9,433,283 B2 * | 9/2016 | Hall | A47J 47/16 | |
| 9,623,806 B2 * | 4/2017 | Rodriguez | B60R 7/043 | |
| 2003/0129038 A1 * | 7/2003 | Addy | B60P 3/40 | 410/97 |
| 2004/0124222 A1 * | 7/2004 | Richter | B60R 7/02 | 224/311 |
| 2008/0035687 A1 * | 2/2008 | Beaulieu | B60R 7/043 | 224/275 |
| 2008/0156834 A1 * | 7/2008 | Tipaldo | A45F 3/14 | 224/258 |
| 2010/0258602 A1 * | 10/2010 | Amin | A45C 13/30 | 224/275 |
| 2011/0248057 A1 * | 10/2011 | Schmitz | A45C 3/04 | 224/275 |
| 2012/0042434 A1 * | 2/2012 | Bird | A01M 31/004 | 2/69 |
| 2016/0081446 A1 * | 3/2016 | Maddox | A45C 11/00 | 224/257 |

* cited by examiner

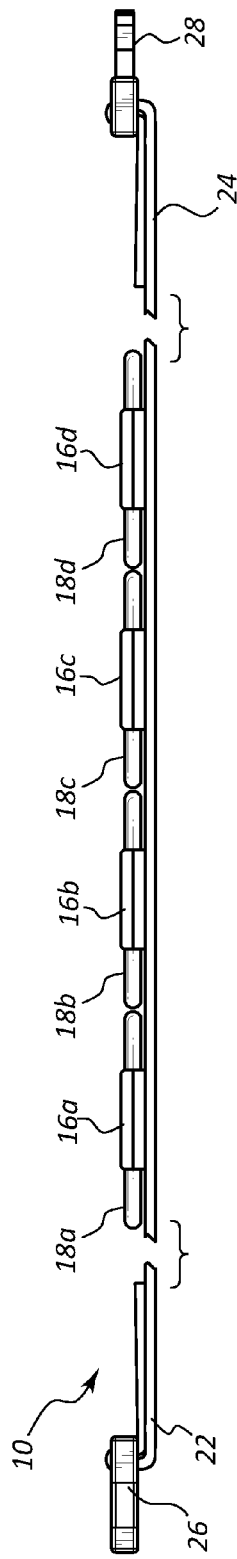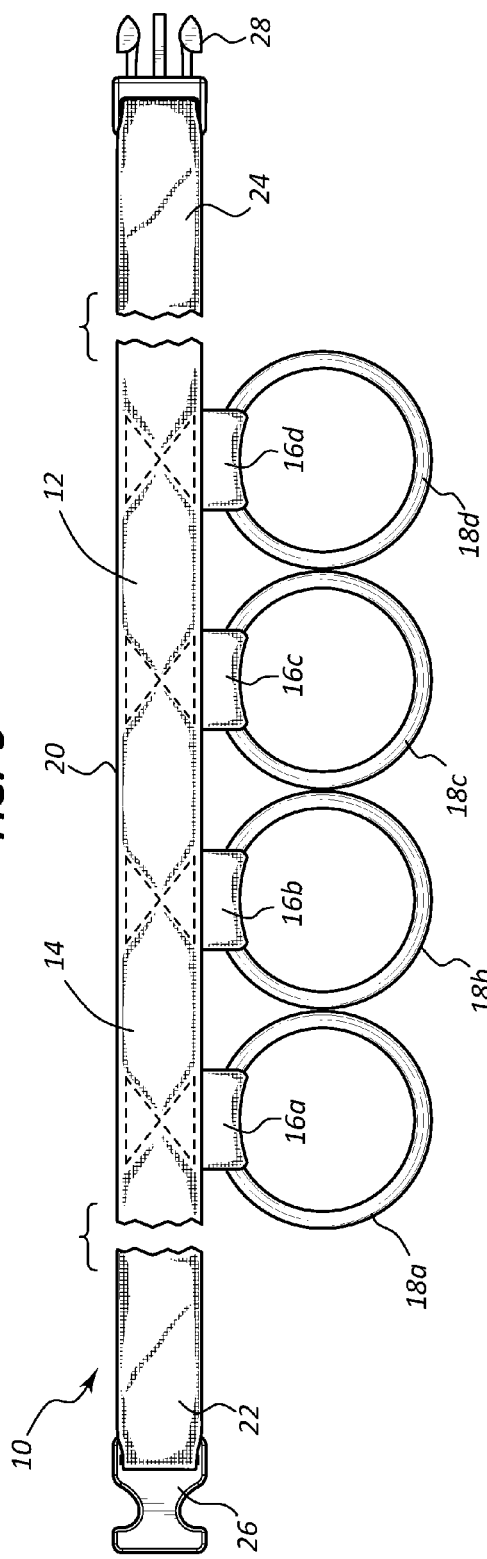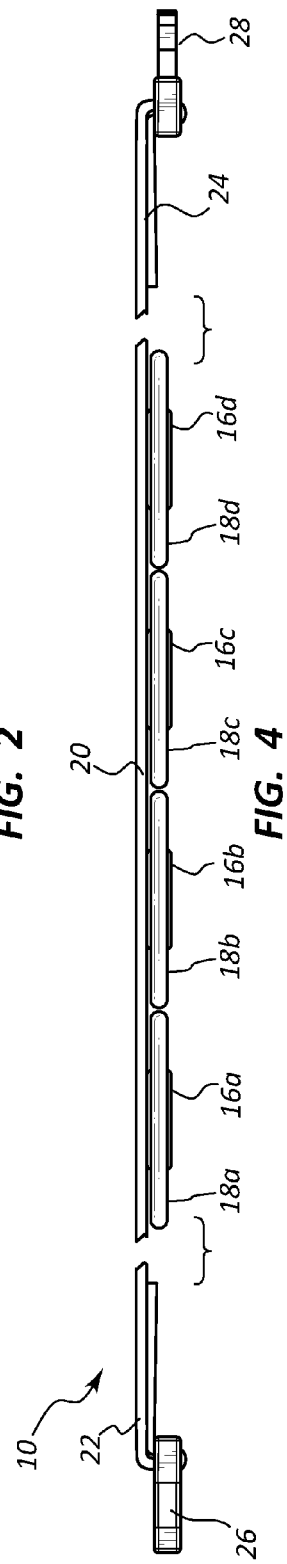

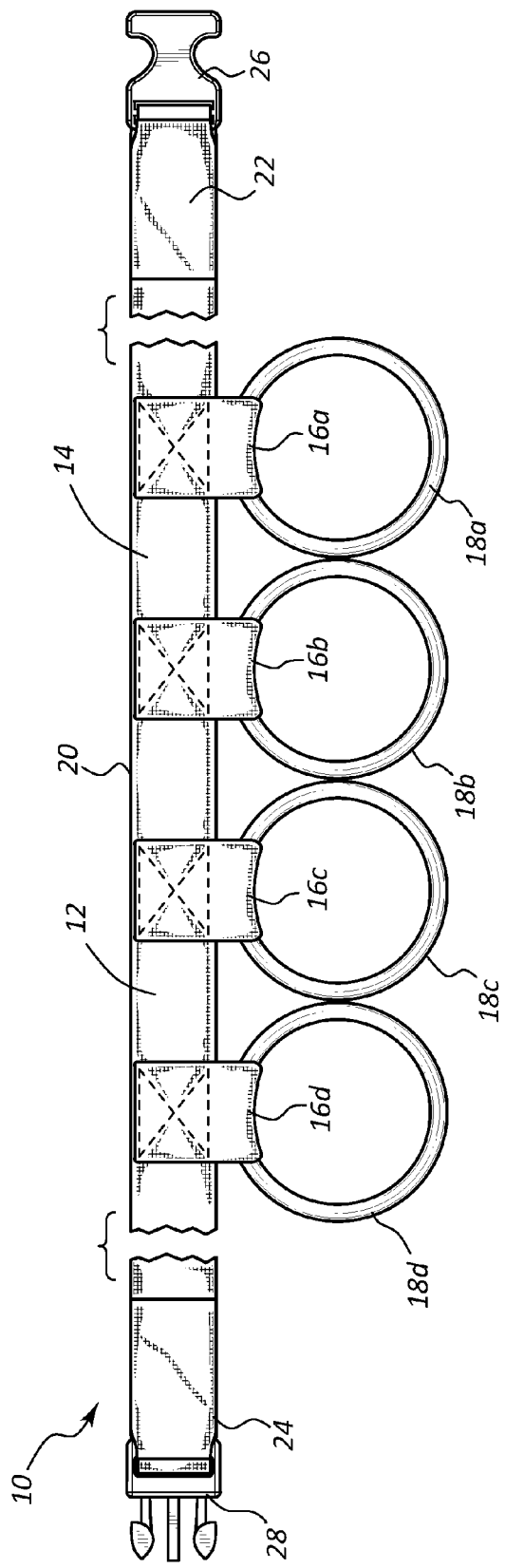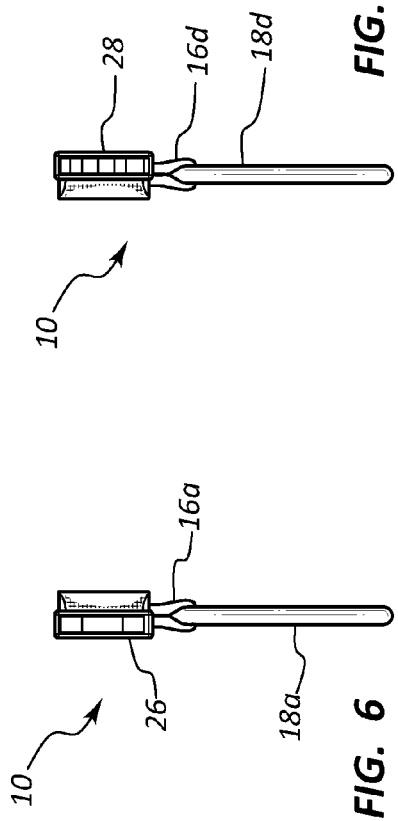

HANGER MOUNTING ASSEMBLY

BACKGROUND OF THE INVENTION

1. The Field of the Invention

This invention is in the field of clothing hangers and mounting systems.

2. The Relevant Technology

The hanger for receiving clothing or other articles or products has been a very useful article of manufacture throughout history. Clothing hangers have been widely used for keeping clothing organized, in good repair, and for displaying clothing in retail settings. Hangers also maintain clothing in a safe and clean environment during transportation.

It is often frustrating, however, for customers of retail stores and dry cleaning shops to receive large bundles of clothing in a single clothing pickup and then transport the clothing via automobile, for example, back to a customer's residence.

A package of clothing from a dry cleaning establishment, for example, may be comprised of five or ten hangers with corresponding shirts, pants, or other articles of clothing hanging from the hanger. All of the weight of each hanger in the hanger bundle is focused on the rounded hook portion of each hanger at the top of the hanger. The weight of the curved hook portion of each hanger is focused on the user's fingers and is heavy and difficult to manipulate and hold, particularly while transferring the hangers to a device configured to hold the hangers, such as a clothing hanger tab mounted on a car ceiling. Other cars are equipped with handles in the backseat on the ceiling on which a packet of hangers from the dry cleaners can be mounted during transportation from the dry cleaners.

Furthermore, with each of these vehicle hanging systems, there are problems with surface area and access. It is often difficult and cumbersome to locate, access and mount a hanger packet on a hanger tab in the ceiling of a car, particularly if the car is a smaller car, does not fit the size of the user, or is loaded with other gear. In addition, the user must often strain a bundle of hangers into an awkward position in order to place the hanger bundle into the user's car so as to fit within a hanger tab or handle in the user's car. As a result, clothing picked up from the dry cleaners is often awkwardly mounted within a user's automobile.

It would therefore be useful to employ a new and improved mounting system for mounting hangers and hanger packets, such as those received from dry cleaner establishments and transported to another location, such as in an automobile.

BRIEF SUMMARY OF THE INVENTION

The present invention relates to a portable hanger mounting assembly which increases the potential surface area available in a vehicle, such as an automobile or other vehicle, for the hanging of hangers. The hanger assembly of the present invention increases the surface area and makes hanging multiple hanging packets more convenient for the user. Using the portable hanger assembly of the present invention, the user can hang the corresponding hangers in a desired location, e.g., on the left or right side of a car, not necessarily the location selected by the car manufacturer.

The portable hanger mounting assembly of the present invention comprises a strap assembly, the strap assembly comprising a strap and one or more mounting members, coupled to the strap, each mounting member configured to receive one or more hangers. Each mounting member, which may be a ring, for example, is connected to the strap, such that a user can place one or more hangers onto the mounting member and/or onto the strap. A user can conveniently mount the strap onto a surface of the vehicle, for example onto a headrest of the vehicle, then mount the one or more hangers onto the one or more mounting members and/or onto the strap, thereby increasing the surface area available within a vehicle to receive one or more hangers.

By placing the strap assembly onto a headrest and connecting the one or more hangers onto the strap assembly, a user can select a desired location for mounting the hangers and more conveniently place one or more hangers, including one or more hanger packets within the vehicle. The hanger mounting assembly of the present invention can thus turn the headrest of the vehicle (right or left side) into a convenient location for hanging multiple hangers and hanger packets. The mounting assembly, connected to a headrest, is often more convenient for placing one or more hangers on because a user can move the entire shirt, jacket or other article of clothing on the hanger completely in the vehicle, as opposed to mounting the hanger or hangers awkwardly onto the side of a vehicle, where many hanger tabs and handles are positioned in a vehicle.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 2 is a front view of the hanger mounting assembly of FIG. 1.

FIG. 3 is a top view of the hanger mounting assembly of FIG. 1.

FIG. 4 is a bottom view of the hanger mounting assembly of FIG. 1.

FIG. 5 is a back view of the hanger mounting assembly of FIG. 1.

FIG. 6 is an end view of the hanger mounting assembly of FIG. 1 and FIG. 7 is an opposing end view of the hanger mounting assembly of FIG. 1.

DETAILED DESCRIPTION OF THE PREFERRED EMBODIMENTS

Figure 1:
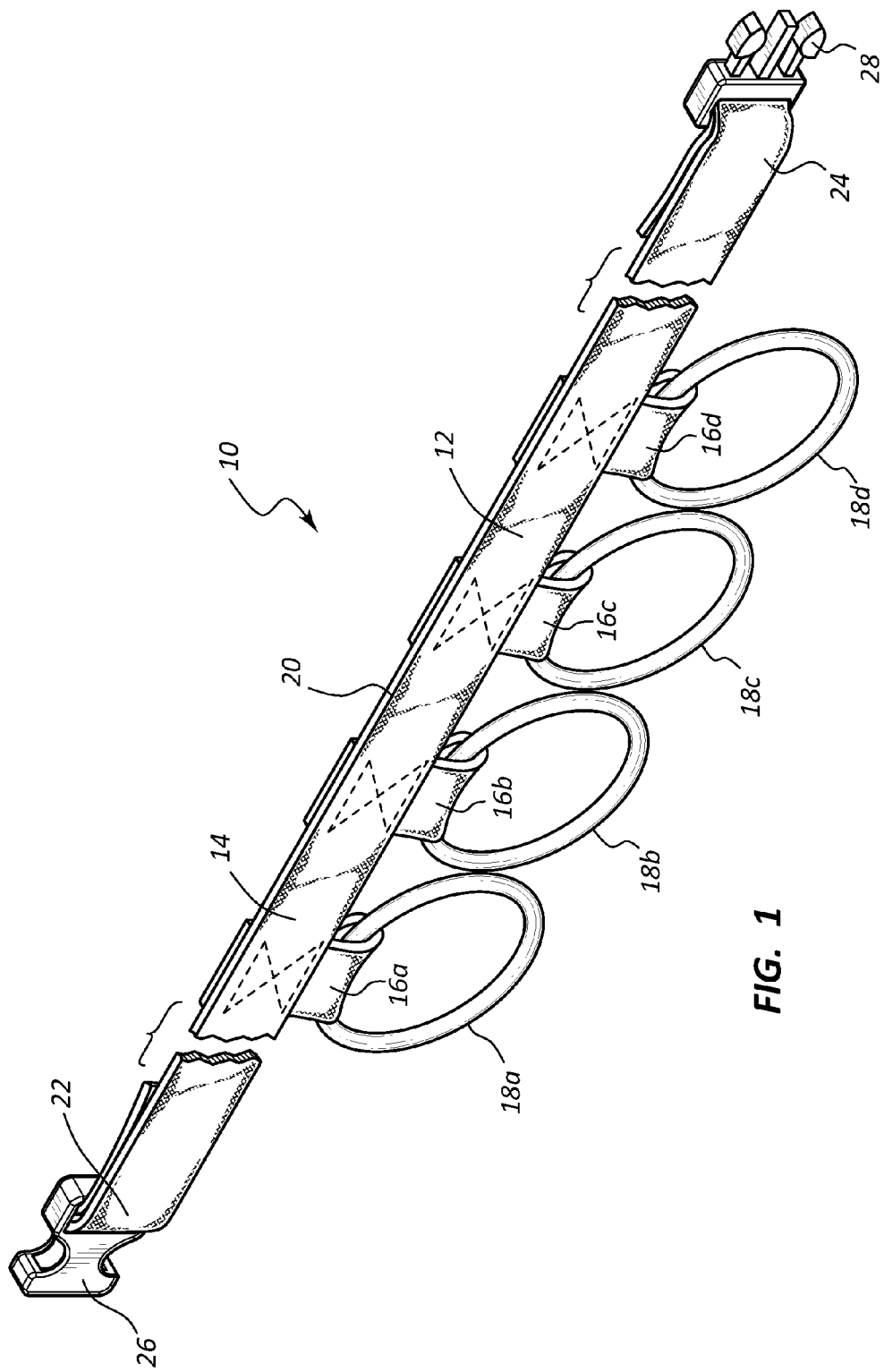
FIG. 1 is a perspective view of a portable hanger mounting assembly of the present invention. The separation lines within opposing sides of the strap and the brackets adjacent the separation lines indicate that no particular length of the strap is claimed.
Figure 8:
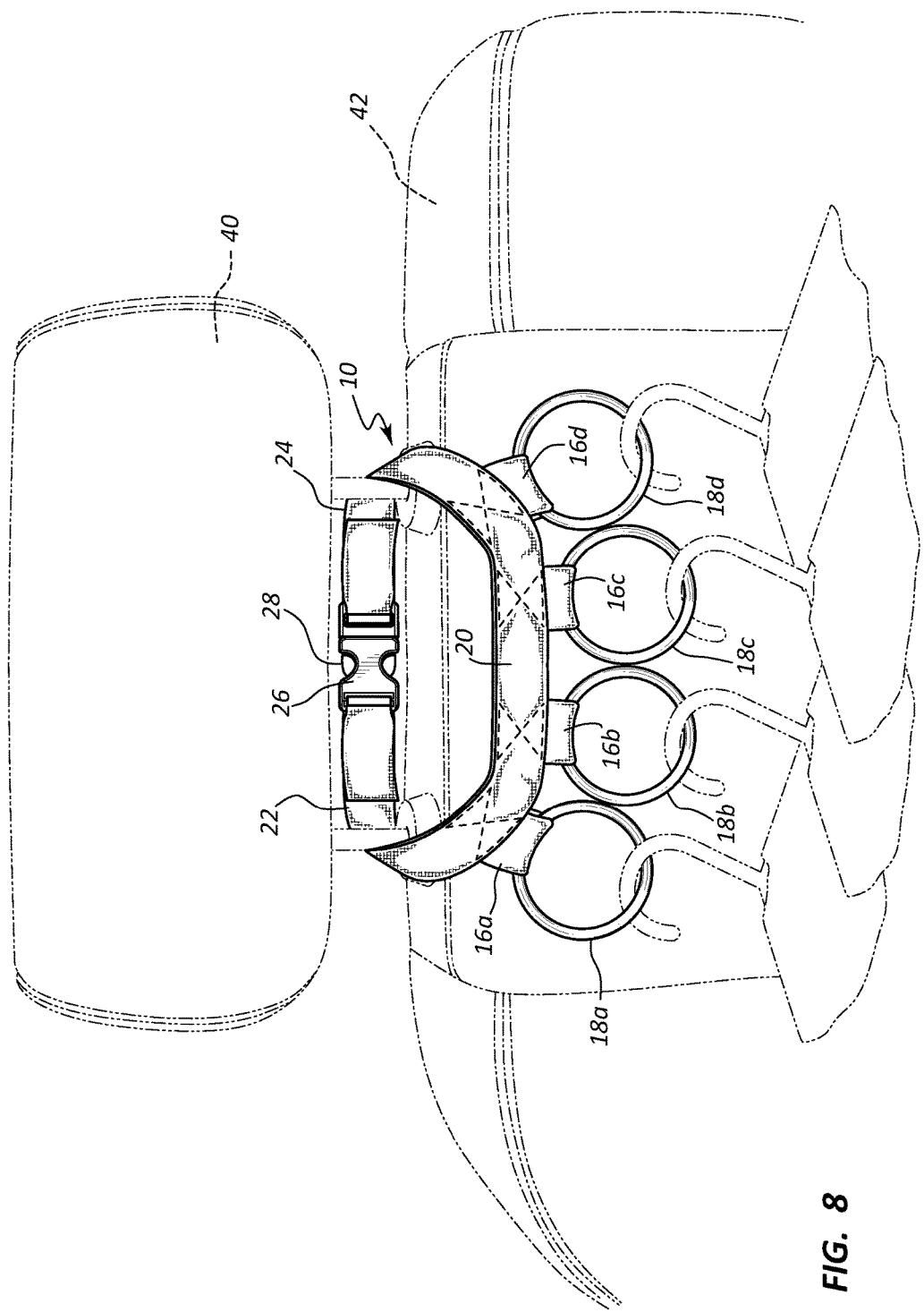
FIG. 8 is a perspective view of the hanger mounting assembly of FIG. 1, wherein the hanger mounting assembly is mounted on a headrest of an automobile seat. The broken lines shown in FIG. 8 to represent the seat and headrest are shown for environmental purposes only and do not form any part of the claimed design of the hanger mounting assembly.

FIG. 1 shows a perspective view of a hanger mounting assembly 10 of the present invention, FIG. 8 showing hanger mounting assembly 10 of FIG. 1 mounted on a headrest of a vehicle.

The hanger mounting assembly 10 comprises a strap assembly 12. Strap assembly 12 is comprised of a strap 14 and a plurality of mounting tabs 16a-16d, which connect respective rings 18a-18d to a central portion 20 of strap 14. Strap 14 has first and second ends 22, 24 having respective mating snap fitting connecting members 26, 28 respectively thereon for connecting strap end 22 to strap end 24.

As shown in FIG. 8, when connectors 26, 28 are selectively moved around a headrest and connected, rings 18a-18d lay downwardly from central portion 20 of strap 14, thereby enabling the user to conveniently place one or more hangers or one or more hanger bundles onto respective rings, thereby increasing the surface area available for hanging hangers. Hangers can also be mounted onto strap 14 itself. Assembly 10 can be selectively mounted on the right or left side of a car or in a retail, dry cleaning or other location where additional surface area for hanging hangers would be helpful.

Rings 18a-d and strap 14 provide a variety of surfaces on which hangers can be hanged. Separate rings 18a-d provide different locations so that four hangers or four hanger packets, for example, can be conveniently mounted onto mounting assembly 10, one on each ring 18a-d. This keeps the hangers or hanger packets organized, and separated and prevents wrinkling, which would otherwise occur if a single tab or handle were the mounting point for an entire batch of hangers or hanger packets.

As shown, strap 14 is comprised of a fabric strap that is sufficiently flaccid to enable ends 22, 24 of strap 14 to be moved about and connected onto a headrest by engaging perspective mating connecting members 26, 28. Connecting members 26, 28 comprise mating plastic clips although a variety of other mating connecting members may be employed, e.g. VELCRO, snaps, or a variety of other connecting members that mate conveniently with each other.

Connecting tabs 16a-d are flaccid fabric connecting tabs, in the form of loops, each having first and second ends that connect to strap body 14 in the central portion 20 of strap 12, thereby flexibly connecting respective rings 18a-d via respective tabs 16a-d onto strap 12. This flexible connection conveniently allows rings 18a-d to be moved to desired locations on which hangers can be mounted.

The mounting members of FIGS. 1 and 2 are in a form of rings 18a-d, each having a hole there-through. However, other mounting members may be employed, for example, D shaped members having a hole there through, square or elongate rectangular shaped members having a hole there through, triangular shaped members having a hole there through, or various other mounting members having a hole there through that can be used as an attachment point for one or more hangers.

Rings 18a-d are flexibly coupled via flexible connection tabs 16a-d respectively to strap body 14 such that rings 18a-d can be moved to adjust for the location of the hooks of hangers or hanger packets as they are placed within the rings 18a-d. The flexible connection afforded by tabs 16a-d enables rings 18a-d to be positioned as desired by a user.

Also shown in FIGS. 1-2, rings 18a-d are connected by tabs 16a-d to strap body 14 such that rings 18a-d are adjacent from each other, but flexible tabs 16a-d enable rings 18a-d to be moved so as to be separate from each other and/or to overlap each other as needed to fit a particular bundle of hangers into a desired location. The close coupling of rings 18a-d to each other, with the ability to contact and/or overlap each other, enables an increase of surface area and hanger mounting potential within a small area of strap body, i.e. portion 20 of strap body located away from ends 22-24. This enables the user to put large numbers of hangers onto hanger mounting assembly 10 within various positions within the central portion 20 of strap assembly 12.

In use, a user adjusts the headrest 40 on seat 42 of the vehicle, such that hanger mounting assembly 10 can be mounted thereon. The user than grasps the ends 22-24 of strap assembly 12 and connects them to each other with strap assembly 12 mounted onto headrest, as shown in FIG. 8, with strap connecting member 26, 28 connected behind headrest 40 and with strap body 14 circumscribing the poles of headrest 40 as shown in FIG. 8. A user then puts one or more hangers in one or more mounting members 18a-18d, for example, placing hanger packet in each of rings 18a-18d such that a plurality of hanger packets can be conveniently mounted within a respective plurality of rings 18a-18d.

In one embodiment, the user first places one or more hangers into ring 18a then places another one or more hangers into ring 18b and yet another one or more hangers into ring 18c and yet another one or more hangers into ring 18d, thereby providing extensive convenient surface area for mounting four or more hangers into one or more hanger rings.

In yet another embodiment, one or more hangers are placed onto strap 12 itself by placing the hooks of the hangers onto strap body 14 as strap assembly 12 hangs around headrest 40. Thus, strap 12 itself provides additional surface area for hanging.

A hanger mounting assembly 10 for mounting one or more hangers onto a surface for convenient organized mounting of the hangers, thus comprises a flexible strap 14 configured to be selectively mounted onto a surface, and one or more mounting members, e.g., rings 18a-d, flexibly mounted on the strap 14 for receiving one or more hangers, such that one or more hangers can be selectively and conveniently mounted on the hanger mounting assembly 10 and such that the hanger mounting assembly 10 can be selectively repositioned to a different location selected by the user.

The hanger mounting assembly 10 comprises a flexible strap 14 configured to be selectively mounted onto a surface, and one or more mounting members, such as rings 18a-d flexibly mounted on the strap 14 for receiving one or more hangers, such that one or more hangers can be selectively and conveniently mounted on the hanger mounting assembly and such that the hanger mounting assembly can be selectively repositioned to a different location selected by the user.

In the embodiment shown, the mounting members comprise rings 18a-d having holes there through for receiving one or more hangers within the rings 18a-d. Strap 14 comprises a flaccid fabric strap. Mating connectors 26, 28 are on the ends of the strap 14 for selected mating to each other. Fabric mounting tabs 16a-d flexibly mount mounting member rings 18a-d on the strap 14.

A method for mounting hangers onto a surface, comprises (i) providing a hanger mounting assembly 10 comprising a strap 14 having ends that are selectively connected to each other and further comprising a plurality of mounting members having holes therethrough for receiving one or more hangers therein a hanger assembly for mounting the strap onto a surface; and (ii) placing one or more hangers into the plurality of mounting members. The method further comprises mounting the assembly 10 on to the surface. In one embodiment, the surface is a headrest 40 of the vehicle. The method may further comprise mounting a hanger onto the strap 12. The method further comprises removing the hangers from the assembly 10, removing the strap from the headrest and moving the assembly 10 to a different location.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable hanger mounting assembly for selectively, conveniently mounting one or more hangers onto a surface for convenient, organized mounting of the hangers, the hanger mounting assembly comprising:
   a flexible, flaccid fabric strap configured to be selectively mounted onto a surface, the strap comprising a first end, an opposing second end, and a central portion extending between the first end and the second end;
   a first connecting member disposed at the first end of the strap;
   a second connecting member disposed at the second end of the strap, the second connecting member and the first connecting member being configured for mating to each other;
   a plurality of flexible, flaccid fabric mounting tabs each sewn to the strap at a fixed location and permanently positioned adjacent to one another in the central portion of the strap, the mounting tabs each forming a loop; and
   a plurality of mounting rings flexibly mounted on the central portion of the strap by means of the mounting tabs, respectively, each of the mounting rings extending between opposing ends of a corresponding mounting tab and into the loop of said corresponding mounting tab, each of the plurality of mounting rings having a hole therethrough for receiving one or more hangers within each of the plurality of mounting rings, such that one or more hangers can be selectively and conveniently mounted on the hanger mounting assembly and such that the hanger mounting assembly can be selectively repositioned to a different location selected by the user.

2. A hanger mounting assembly as recited in claim 1, wherein the plurality of mounting tabs each have a first end and an opposing second end that connect to the strap.

3. A hanger mounting assembly as recited in claim 1, wherein each of the mounting rings is selected from the group consisting of a circular member, a D-shaped member, a square-shaped member, an elongate rectangular-shaped member, and a triangular-shaped member.

4. A hanger mounting assembly as recited in claim 1, wherein the mounting rings are configured to move with respect to each other by means of the mounting tabs.

5. A portable hanger mounting assembly for selectively, conveniently mounting one or more hangers onto an automobile headrest for convenient, organized mounting of the hangers, the hanger mounting assembly comprising:
   a strap assembly comprising
   a flexible, flaccid fabric strap having a first end, an opposing second end, and a central portion extending between the first end and the second end;
   a first connecting member disposed at the first end of the strap;
   a second connecting member disposed at the second end of the strap, the second connecting member and the first connecting member being configured for mating to each other to connect the first end of the strap to the second end of the strap about an automobile headrest;
   a plurality of flexible, flaccid fabric mounting tabs each sewn to the strap at a fixed location and positioned adjacent to one another in the central portion of the strap, the plurality of mounting tabs each having a first end and an opposing second end that connect to the strap to form a loop; and
   a plurality of mounting members connected by the mounting tabs, respectively, onto the central portion of the strap, each of the mounting members forming a closed loop extending between opposing ends of a corresponding mounting tab and into the loop of said corresponding mounting tab, the mounting members each having a hole there through for receiving one or more hangers, thereby enabling the user to selectively, conveniently mount one or more hangers onto the mounting assembly, thus providing convenient hanging of the hangers within an automobile.

6. A hanger mounting assembly as recited in claim 5 wherein the mounting members each comprise a ring.

7. A hanger mounting assembly as recited in claim 5 wherein each of the mounting members is selected from the group consisting of a D-shaped member, a square-shaped member, an elongate rectangular-shaped member, and a triangular-shaped member.

8. A hanger mounting assembly as recited in claim 5 wherein the mounting members are configured to move with respect to each other by means of the mounting tabs.

9. A method for mounting clothing hangers within a vehicle, the method comprising:
   providing a portable hanger mounting assembly for selectively, conveniently mounting one or more clothing hangers onto a vehicle headrest for convenient, organized mounting of the clothing hangers, the hanger mounting assembly comprising:
   (i) a flexible, flaccid fabric strap having a first end, an opposing second end, and a central portion extending between the first end and the second end;
   (ii) a first connecting member disposed at the first end of the strap;
   (iii) a second connecting member disposed at the second end of the strap, the second connecting member and the first connecting member being configured for mating to each other;
   (iv) a plurality of flexible, flaccid fabric mounting tabs each sewn to the strap and permanently positioned adjacent to one another in the central portion of the strap, the mounting tabs each forming a loop; and
   (v) a plurality of mounting rings connected by means of the plurality of mounting tabs, respectively, onto the central portion of the strap, each mounting ring forming a closed loop extending between opposing ends of a corresponding mounting tab and into the loop of said corresponding mounting tab, the mounting rings each having a hole there through for receiving the one or more clothing hangers, thereby enabling the user to selectively, conveniently mount the one or more clothing hangers onto the mounting assembly, thus providing convenient hanging of the one or more clothing hangers within a vehicle; and mounting the strap onto a headrest of the vehicle by mating the first connecting member and the second connecting member; and placing one or more clothing hangers into one or more of the plurality of mounting rings.

10. A method as recited in claim 9, further comprising mounting a hanger onto the central portion of the strap.

11. A method as recited in claim 9, further comprising removing the hangers from the assembly.

12. A method as recited in claim 9, further comprising removing the assembly from the headrest and moving the strap to a different location.

13. A method as recited in claim 9, wherein the mounting members are configured to move with respect to each other by means of the mounting tabs.

14. A method as recited in claim 9, wherein each of the mounting members is selected from the group consisting of a D-shaped member, a square-shaped member, an elongate rectangular-shaped member, and a triangular-shaped member.

* * * * *